Feb. 15, 1955 H. S. HARRISON 2,702,149
AUTOMATIC TIRE INFLATING MACHINE
Filed March 15, 1951 7 Sheets-Sheet 1

INVENTOR.
HOMER S. HARRISON
BY
ATTORNEYS

INVENTOR.
HOMER S. HARRISON
BY
ATTORNEYS

Feb. 15, 1955   H. S. HARRISON   2,702,149
AUTOMATIC TIRE INFLATING MACHINE
Filed March 15, 1951   7 Sheets-Sheet 5

INVENTOR.
HOMER S. HARRISON
BY
ATTORNEYS

Feb. 15, 1955  H. S. HARRISON  2,702,149
AUTOMATIC TIRE INFLATING MACHINE
Filed March 15, 1951  7 Sheets-Sheet 6

INVENTOR.
HOMER S. HARRISON
BY
ATTORNEYS

United States Patent Office 2,702,149
Patented Feb. 15, 1955

2,702,149

AUTOMATIC TIRE INFLATING MACHINE

Homer S. Harrison, Detroit, Mich., assignor to Allied Steel and Conveyors, Inc., Detroit, Mich., a corporation of Michigan Application March 15, 1951, Serial No. 215,736

29 Claims. (Cl. 226—20.6)

This invention relates to an automatic tire inflating machine and more particularly to a conveyor type of machine wherein wheels with tires to be inflated may be loaded at one end of the conveyor, coupled with tire inflating apparatus, and discharged from the conveyor fully inflated to a desired predetermined pressure. The invention also relates more generally to the provision of a moving air pressure supply line with manifold outlets adaptable to various industrial conveyor line requirements.

The invention includes apparatus for holding an air chuck in operative engagement with the valve stem of a tire tube throughout its travel on the conveyor; apparatus for leading air pressure simultaneously to a plurality of air chucks, such chucks being connected to a plurality of tires simultaneously on the conveyor throughout the movement of the tires from one end of the conveyor to the other; and apparatus for changing the pressure led to the air chuck at an intermediate point along the conveyor travel.

A number of inherent problems are involved in providing a satisfactory tire inflating machine. One serious problem arises from the fact that the rate of flow of air through an orifice such as the valve stem of a tire tube is substantially proportional to the pressure differential between the source of pressure and the tire pressure. Thus, if the main supply pressure were maintained at a value equal to the final desired tire pressure, flow of air would be so slow as to require an exorbitant amount of time and an impracticable length of conveyor in order to handle large volume requirements, for example, as encountered in an automobile assembly plant.

If, on the other hand, a high pressure (e. g. several times final tire pressure) is maintained at the source, and some form of timing device is relied upon to limit the volume of flow to that required for final desired tire pressure, commercial variations in the effective valve orifices render it impossible to obtain sufficiently uniform tire pressures throughout a production run. The problem of relying on a high pressure plus a timing device is even more acute where, as in the normal case, tires of different sizes are required to be handled at random in a single inflating machine.

On the other hand the provision of a pressure control valve in the air chuck which would permit a wide open flow of high pressure until a predetermined pressure in the tire is reached is an extremely difficult, if not an inherently impracticable solution to the problem, since it is impossible to measure directly and accurately the pressure within a tire from the outside of the tire valve while air is flowing through the valve because of the pressure differential on either side of an orifice under conditions of flow. Pressure control mechanism which would at intervals shut off the flow while the tire pressure is measured might be employed but would of necessity introduce complexities and expense from a manufacturing standpoint, particularly where it is necessary to provide for simultaneous inflation of a large number of tires.

An important object of the present invention is to provide an answer to this general problem through the use of two alternate supply pressures and mechanism for converting from one to the other at an intermediate point in the conveyor travel. Through the use of such means it is possible to employ a high supply pressure during the first portion of inflation which can be timed through the conveyor travel to provide an average tire pressure equal to the final desired pressure, and then at an intermediate point change to a source pressure equal to the final desired tire pressure, allocating a final portion of conveyor travel to the correction of any error in pressure arising from commercial variations in valve orifices or from differences in tire sizes.

By using such combination of alternate supply pressures it has been found possible to arrive at a consistently accurate final tire pressure with a comparatively short and entirely practicable length of conveyor, divided, for example, into approximately equal portions of fast inflation with high supply pressure and error correction at the lower final pressure.

Another serious problem in any straight line conveyor type of tire inflating machine is that of continuously leading the supply pressure to a plurality of air chucks during their travel along the conveyor. This problem would be greatly simplified if a circular conveyor could be used which would lend itself to a rigid supply pressure pipe construction. However, a circular conveyor of appropriate length would involve a waste of floor space in the center and would also be subject to the objection of returning the tires to their starting point rather than to a point advanced along an assembly line as required in conventional "in line" assembly plant layouts.

If a plurality of air chucks are to be carried along the surface of a straight conveyor throughout its length and then returned to their starting point, a loop arrangement comparable to that of the conveyor itself involving the use of flexible pressure lines is indicated in place of any rigid pipe line construction. But if an endless flexible hose with manifold connections to air chucks is employed in a form comparable to the conveyor loop, the supply connection to such manifold hose necessarily moves around the entire loop presenting a somewhat perplexing problem of providing an expanding and contracting pressure lead line from a fixed source of pressure. Accordingly, another major object of the present invention is to provide a practicable means for supplying both the high pressure and the final supply pressure to a pair of endless pressure hoses formed in loops to travel in synchronized movement with the wheel conveyor.

A further object to this connection is to provide a simple and practicable means for alternately connecting either of two supply pressures to each air outlet traveling with the two loops of supply hose such as to permit each individual air chuck to be automatically converted from high pressure to low pressure at an appropriate point along the conveyor line independent of the pressure at the other air chucks.

A third problem in providing a satisfactory tire inflating machine is that of effectively coupling the air chucks with the individual valve stems at the beginning of the conveyor travel so as to automatically hold the air chuck in proper inflating engagement throughout the travel along the conveyor and, preferably, automatically release the air chuck from the tire valve stem at the end of the conveyor travel. Accordingly, it is a further object of the present invention to provide a convenient and effective clamping means for each air chuck which will serve these functions.

Another object is to provide an apparatus for conducting an air pressure supply to a plurality of moving outlets as may be required in various conveyor line operations.

These and other objects will appear more clearly from the following detailed description of a particular embodiment of my invention and from an examination of the drawings forming a part hereof wherein:

Fig. 17 is a schematic diagram of the manifold pressure hose loops, the pressure lead lines to such loops, and the reel for feeding and retracting the lead lines, shown in a position where the pressure lead lines are being fed out from the reel;

Fig. 18 is a similar view at a position where the lead lines are being wound back on to the reel; and Fig. 19 is a similar diagram at the moment when the feed lines are fully wound.

Figure 1:
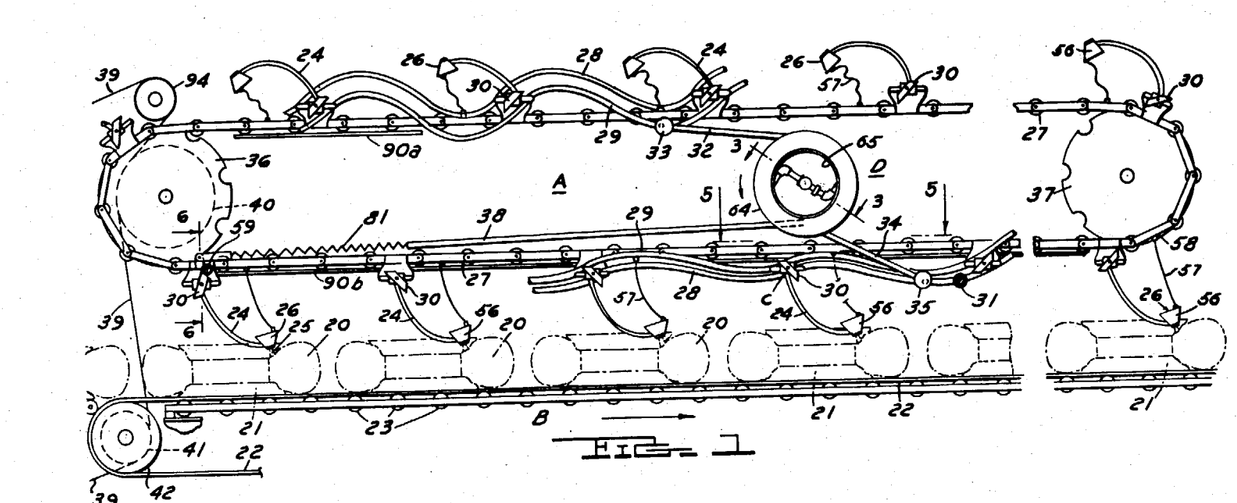
Fig. 1 is a side elevation of the tire inflating machine showing a wheel conveyor and inflating apparatus thereover.

Referring to Fig. 1 it will be seen that uninflated tires 20 mounted on wheel rims 21 pass on to a belt conveyor 22 the upper reach of which travels along supporting rollers 23 moving from left to right as seen in the drawing. As each tire passes on to the left hand end of the conveyor belt 22 one of the manifold outlet hoses 24 of the inflating apparatus, generally indicated as A, is manually coupled to the valve stem 25 of such wheel by a clamping member 26 as later described in detail, such clamping member holding an air chuck at the end of the outlet hose 24 in an open inflating position during the travel of the tire across the conveyor, generally indicated as B. Each outlet hose 24 moves with its tire along the length of the conveyor whereupon it is automatically uncoupled and returned by means of an endless conveyor chain 27 to the left hand end of the conveyor B where it may again be coupled to an approaching tire.

During the first portion of its travel along the conveyor each outlet hose 24 is supplied with high pressure air from manifold line 29, which may be several times the finally desired tire pressure, in order to secure a rapid inflation of each tire to approximately its final pressure. At a point based on the average time required with the high pressure supply to inflate the tire to the final desired pressure, a valve generally indicated as C at the T connection of each outlet 24 with the low and high pressure manifold lines 28 and 29 is actuated by the engagement of a valve arm 30 with a stationary member 31 which connects the outlet hose 24 with manifold supply line 28 carrying the final tire pressure, whereupon the remainder of the travel on the conveyor may be employed to correct any inaccuracies in pressure arising from commercial variations of valve openings, different tire sizes, etc.

Figure 10:
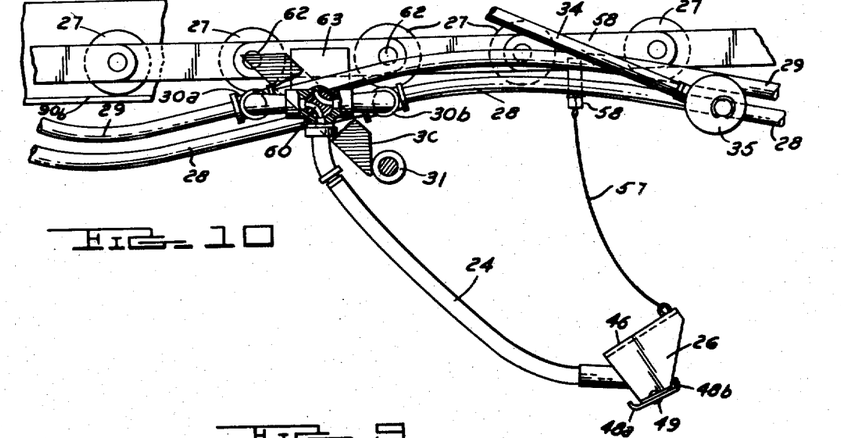
Fig. 10 is a fragmentary enlarged side elevation of one of the manifold pressure outlets taken along the line 10—10 of Fig. 5 showing in cutaway section the valve for alternating the outlet connection between the two pressure manifold lines.

As shown in Fig. 1 two complete endless loops 28, 29 of pressure hose are carried by and conform generally to the path of the conveyor chain 27, each loop being in the nature of a manifold having fittings 30a for connection with each valve C for each outlet hose 24 individually shown in Fig. 10.

At diametrically opposite points in each manifold loop, connections 33, 35 are provided with high and low pressure feed lines 32, 34 which are wound on a central reel, generally indicated as D, the high pressure line 32 being connected to the inner manifold 29 while the low pressure line 34 is connected to the low pressure manifold 28. As hereinafter described in detail, provision is made for permitting the reel D to unwind the pressure lead lines 32, 34 as the conveyor advances from the position shown in Fig. 1 until each of the swivel connections 33 and 35 is respectively at the far side of the head sprocket 36 and tail sprocket 37, such unwinding movement causing a rewind line 38 connected to the conveyor chain 27 at a point intermediate the pressure connections 33, 35 to be wound in an opposite direction onto the reel, and the rewind line 38 is utilized to wind the feed lines 32, 34 back on to the reel as the connections 33 and 35 return from the extremities of the sprockets 36, 37 to a central position opposite the wind up reel D.

Movement of the inflating apparatus conveyor A and wheel conveyor B is synchronized through a common drive chain 39 which may also be synchronized with the drive of preceding conveyor apparatus such as a tire mounting machine, not shown. The chain 39 engages opposite sides of a drive sprocket 40 for the upper conveyor A and a second drive sprocket 41 for the wheel conveyor B so that adjacent surfaces of the two conveyors will travel in the same direction, and the diameters of the respective sprockets 40 and 41 are chosen to provide equal conveyor surface speed, compensation being made for the different diameters of the head sprocket 36 and belt pulley 42.

From the above brief description of the general arrangement it will be understood that the only manual operation in the entire inflating process is that of positioning the clamping member 26 on the tire valve stem 25 at the loading end of the conveyor.

Figures 11, 12, 13, 14, 15:
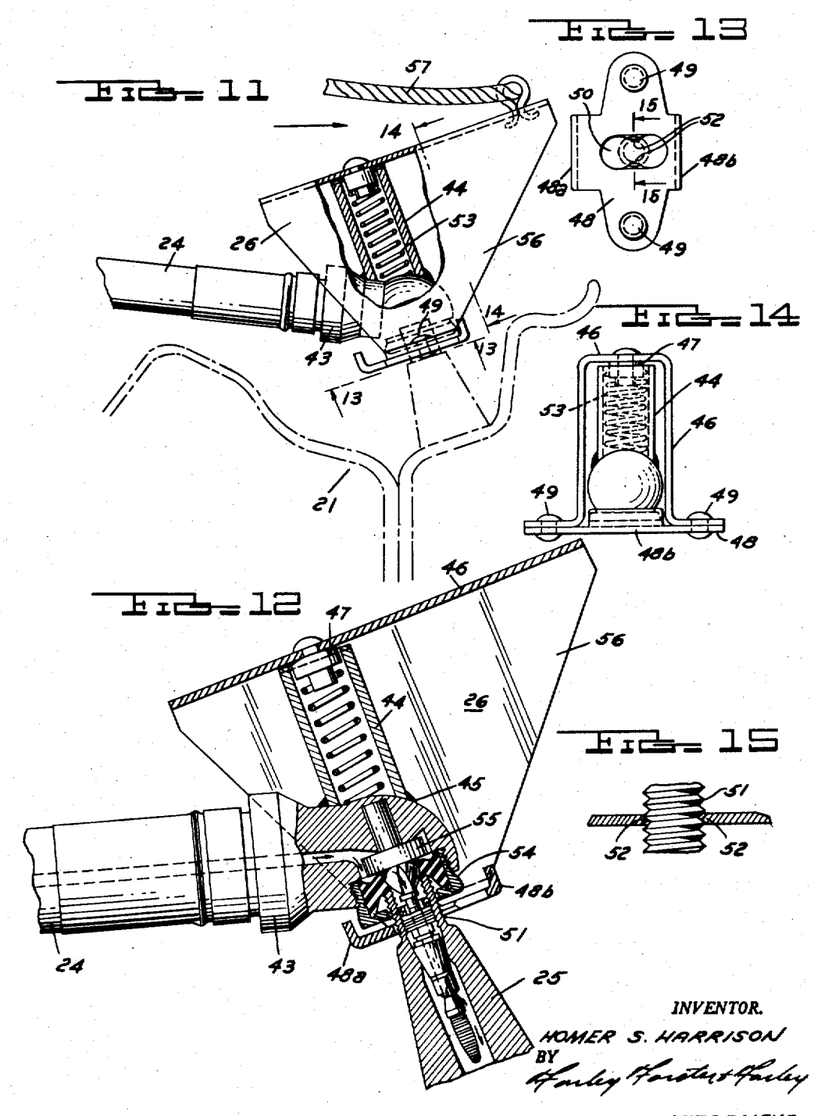
Fig. 11 is an enlarged fragmentary side elevation of one of the air chucks at the end of a manifold outlet as shown in Fig. 10, illustrating a clamping device for holding the air chuck in operative engagement with the valve stem of a tire.
Fig. 12 is a view similar to Fig. 11 sectioned to show the internal parts of the air chuck and tire valve and showing the clamping device in its apply or release position without holding engagement.
Fig. 13 is a view of the valve stem thread engaging member of the clamping device taken along the line 13—13 of Fig. 11.
Fig. 14 is a sectional view of the clamping device taken along the line 14—14 of Fig. 11.
Fig. 15 is a sectional view taken along the line 15—15 of Fig. 13 illustrating the thread engagement of the clamping member.
Figure 16:
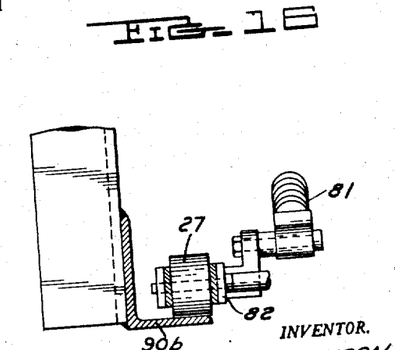
Fig. 16 is a sectional view taken along the line 16—16 of Fig. 3.

Proceeding now to a detailed description of component parts and their operation, Figs. 11 to 15 show the construction of the clamping member 26. Each outlet hose 24 is provided with a standard air chuck 43 which is adapted when pressed over the valve stem 51 of a conventional tire valve 25 to establish inflating communication therewith. The air chuck 43 is adapted to be held in inflating position relative to the tire valve by the clamping member generally referred to as 26. The clamping member 26 includes a U-shaped yoke 46 flanged at the lower ends for rigid attachment to a cross member 48 by rivets 49. The under surface of the cross member 48, as best shown in Fig. 13, includes a slotted opening 50 having hardened teeth 52 projecting inwardly at the center of such opening. The opening at the left side of the teeth 52, as seen in Fig. 13, is sufficient opening to pass freely over the end of the valve stem 51, as shown in Fig. 12, while the teeth 52 are adapted to engage the threads on either side of the valve stem 51 when the member 48 is thereafter shifted to the left to bring the teeth 52 into centerline position relative to the valve stem 51. Such thread engaging position of the member 48 is shown in Figs. 11 and 13. Upwardly projecting ears 48a and 48b on the member 48 limit the lateral shifting movement of the member 48 relative to the air chuck, the ear 48b engaging the lip of the air chuck when the teeth 52 are in thread engaging position relative to the valve stem 51. The air chuck 43 is resiliently mounted within the yoke member 46 by means of a tube 44 welded at 45 to the top of the air chuck. The upper end of the tube 44 is engaged by pin 47 riveted to the top surface of the yoke member 46, such pin and attached clamping member 26 being spring loaded relative to the air chuck 43 as shown in Figs. 11 and 12.

The normal free position of the air chuck in clamping member 26 before connection to the tire valve 25 is such as to cause the face of the air chuck to be spring loaded into engagement with the upper surface of the member 48 with the center of the air chuck in alignment with the left clearance portion of the slotted opening 50 such as to permit application of the member 48 and air chuck 43 over and into inflating engagement with the valve stem 51 as shown in Fig. 12. Straight hand pressure on the top of the member 46 in an axial direction relative to a tire valve 25 will initially establish inflating engagement under the preload force of the spring between the air chuck 43 and clamping member 26. Such preload force is adequate to provide the displacement of the respective valve members in the tire valve 25 and air chuck 43 to open the inflating passages while additional hand pressure will cause compression of the spring and a slight downward movement of the member 48 relative to the face of the air chuck to an extent limited by initial clearance between the top of the tube 44 and the adjacent surface of the yoke member 46 which is preferably at least equal to the lead of one complete thread on the valve stem 51. Thread engaging movement of the member 48 toward the left from the position shown in Fig. 12 may be effected by exerting additional downward pressure on the upper right end 56 of the yoke member 46 thereby rocking the clamping member 26 relative to the air chuck about a fulcrum point at the top of the tube 44. Such engaging movement of the member 48 is limited by the engagement of the ear 48b with the lip of the air chuck as shown in Fig. 11 in which position the threads 52 are centrally engaged with the threads of the valve stem 51 and manual release of the clamping member in such position will cause the air chuck to be retained in inflating position under frictional engagement of the teeth 52 with the threads of the valve stem 51. It will be understood that the normal clearance between the upper end of the tube 44 and the member 46 which permits the member 48 to be displaced downwardly slightly relative to the air chuck after inflating engagement is established will facilitate thread engagement at a low enough position on the valve stem 51 to assure an inflating seal between the air chuck and valve stem when hand pressure is removed from the clamping member since the engagement by the teeth 52 of a thread on the valve stem 51 at any point below the fully seated position of the air chuck will assure maintenance of the full preload spring pressure.

Just as downward pressure on the right end 56 of the clamping member will cause a shift of the member 48 to the left toward thread engaging position, a reverse upward pull will similarly cause the member 48 to shift to the right to disengage the teeth 52 from the valve stem 51 and permit the air chuck and member 48 to freely leave the tire valve 25. Automatic disengagement of the clamp 26 at the discharge end of the conveyor is effected by a line 57 secured to the forward end 56 of the clamp and to a link 58 (see Fig. 1) of the conveyor chain 27 in a manner adapted to create a tension in the line 57 and the link 58 moves up onto the tail sprocket 37 thereby raising the end 56 of the clamp 26 to pivotally rock the clamp relative to the air chuck in a disengaging direction.

As a tire with the outlet hose 24 coupled thereto advances under the head sprocket 36 one end of the valve actuating arm 30 contacts a fixed roller 59 in its path rotating the four way valve cock 60 (see Fig. 10) to a position for connecting the high pressure manifold 29 with the outlet hose 24. During the travel between the fixed roller 59 and the second fixed roller 31, rapid inflation takes place bringing individual tire pressures to an average value approximately equal to the final desired tire pressure, the distance between the rollers 59 and 31 and the speed of the conveyor drive 39 determining the duration of the high pressure inflation period. As best shown in Fig. 10, contact of valve arm 30 with the fixed roller 31 will cause the valve arm to rotate the valve cock 60 to establish communication between the low pressure manifold 28 and the outlet hose 24. The length of the conveyor beyond the stop 31 is made sufficient to correct any individual discrepancies between the desired final tire pressure maintained in the low pressure manifold 28 and the actual pressure effected during the uniform high pressure period. In a typical installation, the latter correction period was made somewhat shorter than the high pressure period (wherein approximately three times final pressure was employed) and gave a final accuracy of pressure within plus or minus one pound per square inch.

Figures 4, 5:
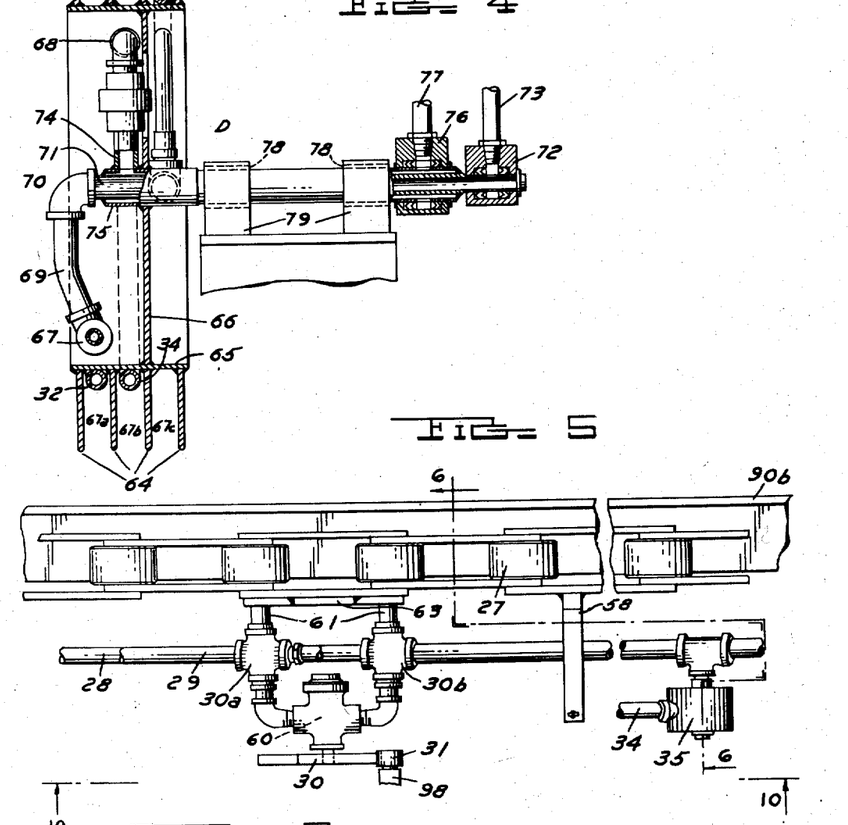
Fig. 4 is a sectional view of the reel taken along the line 4—4 of Fig. 2.
Fig. 5 is an enlarged fragmentary plan view of two pressure manifold hoses and conveyor chain for carrying the same taken along the line 5—5 of Fig. 1.
Figure 6:
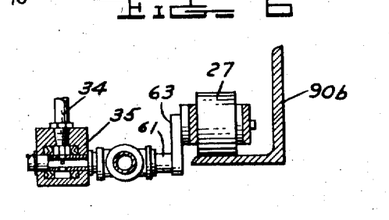
Fig. 6 is a sectional view taken along the line 6—6 of Fig. 5 showing the swivel connection between one of the pressure feed lines and the corresponding endless pressure manifold hole loop.

While the endless manifold arrangement per se is quite simple, comprising two endless flexible hose lines 28 and 29 connected at intervals along the conveyor chain 27 to the valve assemblies C which are in turn carried by extensions 61 of the conveyor chain connecting pins 62 and brackets 63, as best shown in Figures 5 and 10, the problem of leading pressure to these endless flexible manifold lines is somewhat more complex and the reel system employed in the embodiment to meet this problem accordingly requires a somewhat detailed description.

Figure 2:
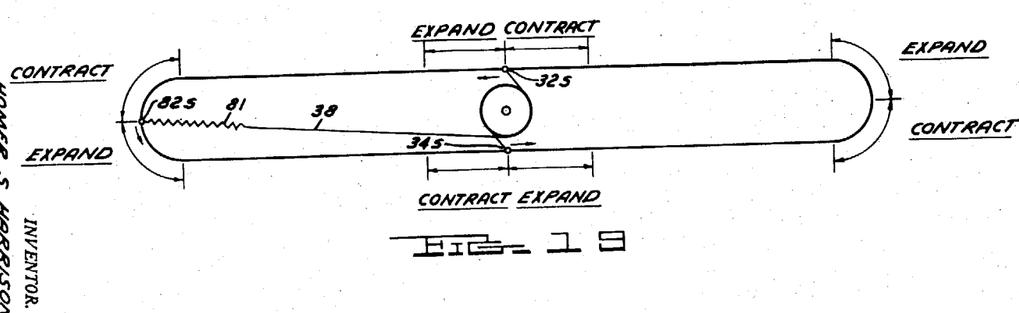
Fig. 2 is a plan view of the inflating apparatus shown in Fig. 1.
Figure 8:
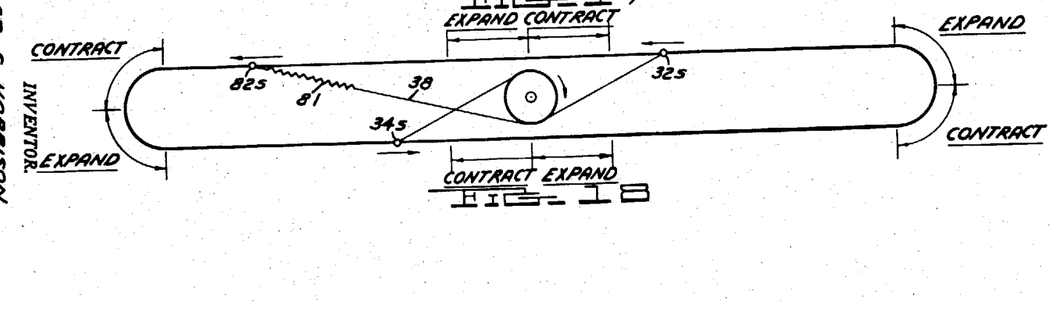
Fig. 8 is a transverse section taken along the line 8—8 of Fig. 2 showing the wheel conveyor and feed line reel for the inflating apparatus.

As best seen in Figs. 1, 2, and 8 the reel D which is employed in leading high and low pressure through feed lines 32 and 34 to the manifolds 29 and 28 is located longitudinally and vertically in the center of the inflating apparatus conveyor A and transversely in substantial alignment with the manifold lines 28, 29 as well as the center of the wheel conveyor B. As shown in Fig. 4, four annular flanges 64 extending outwardly from the drum 65 at the outer perimeter of the reel disc 66 define three reel divisions 67a, 67b, 67c for winding respectively the high pressure lead hose 32, the low pressure lead hose 34, and the rewind line 38. The high and low pressure lead lines 32 and 34 extend from their respective swivel connections 33, 35 at diametrically opposite points in the manifold loops 29, 28 to their respective spaces 67a, 67b in the reel in which they are each wound by clockwise rotation of the reel D as seen in Fig. 1. The inner ends of the lead lines 32, 34 passing through openings in the drum member 65 lead to pipe connections 67 and 68 extending to opposite sides of the drum 65. The high pressure fitting 67 connects via pipe 69 and elbow 70 to a central tube 71 extending along the axis of rotation of the reel to a swivel connection 72 and a fixed high pressure pipe 73.

Low pressure fitting 68 communicates through pipe 74 with a sleeve 75 positioned over the center high pressure pipe 71 being welded thereto at either end to form an air tight passage communicating through the swivel fitting 76 with a fixed low pressure pipe 77.

Figure 3:
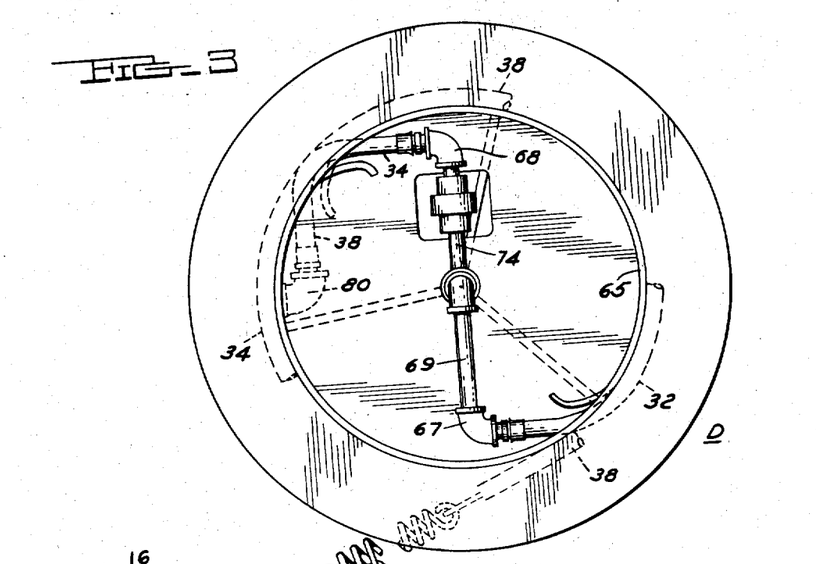
Fig. 3 is an enlarged side elevation of a pressure feed line reel taken along the line 3—3 of Fig. 2.

The sleeve tube 75 rotates in bushings 78 in fixed journals 79 and the reel disc 66 is welded to the outer surface of the sleeve 75 which is accordingly employed as the axle of the reel D. The rewind line 38 in the present embodiment is a third hose member anchored through fitting 80 to the inner perimeter of the drum 65 from whence it is led through an opening in the drum to the space 67c. It will be seen from an examination of Figs. 1 and 3 that the rewind line 38 is wound on the reel in an opposite direction from that of both lines 32 and 34 by counterclockwise rotation rather than clockwise as in the case of the pressure lines 32, 34. The outer end of the rewind line 38 is connected through an extensible spring 81 to a link 82 in the chain 27 located midway between the swivel fittings 33 and 35.

From the above description it will be seen that as the inflating apparatus conveyor A continues to move from the position shown in Fig. 1 tension in the pressure lead lines 32 and 34 will cause the reel D to rotate in a counterclockwise direction feeding out the pressure lines 32, 34 and at the same time winding up line 38 onto the reel. By the time the swivel connections 33, 35, respectively, reach the far side of sprocket members 36 and 37 the rewind line connection with link 82 will be directly in line longitudinally with the center of the reel D corresponding to the fully wound position of the rewind line 38. At this moment the counterclockwise rotation of the reel D stops and further travel of the link 82 past the reel D places the rewind line 38 under tension rotating the reel D in a reverse clockwise direction as necessary to rewind the pressure lines 32 and 34. Thus during that portion of the travel that the swivel connections 33 and 35 are moving outwardly away from the reel D they form the driving members for rotating such reel and for winding up the rewind line 38 while during that portion of the travel that the conveyor link 82 is moving away from the reel the rewind line 38 forms the driving member rotating the reel D in an opposite direction and rewinding the lines 32 and 34.

The spring 81 is used at the end of the rewind line 38 in order to compensate for two effects which prevent the respective winding and unwinding action from exactly equalizing. While the longitudinal travel of the swivel connections 33 and 35 is equal to the longitudinal travel of the rewind connection at the link 82 throughout the upper and lower parallel reaches of the conveyor chain 27, the rate of unwinding from the reel D decreases while the rate of winding increases due to the varying effective diameter of the respective coils on the reel. Thus, at the instant shown in Fig. 1 where the pressure lines 32 and 34 are at a relatively large diameter and the rewind line at a relatively small diameter the rate of rotation effected by the pressure lines 32 and 34 in unwinding is insufficient to produce an equal rate of winding of the line 38 and will decreasingly continue so until the respective diameters become equal whereafter the winding of line 38 becomes progressively faster than the unwinding of lines 32 and 34. The spring 81 can shorten to take up the slack or lengthen to permit faster winding depending on whether the line 38 is being wound at a relatively smaller or a relatively larger diameter than the pressure lines 32 and 34.

The second effect requiring the take up of spring 81 arises from the fact that the longitudinal travel involved in any of the three connections passing around either of the sprockets progressively decreases from conveyor speed to zero and then progressively increases in an opposite direction from zero to conveyor speed. Since the swivel connection 33 and 35 each pass over opposite sprockets while the rewind line connection at 82 is traveling longitudinally at full conveyor speed and since each of the swivel connections 33 and 35 are traveling at full conveyor speed while the rewind connection at 82 is traveling around a sprocket, compensation must be made for the different relative rates of longitudinal travel during these periods.

The requirements for this compensation may be seen graphically from an examination of the schematic Figures 17, 18, and 19 showing different stages of travel of the respective lines. In these figures the changing effect of diameters at the reel is ignored and the effect of sprocket travel alone considered. Fig. 17 shows the schematic connections 32s, 34s, and 82s in substantially the same position as the corresponding connections in Fig. 1, with the pressure lines driving, Fig. 18 showing the rewind line driving and Fig. 19 the relative position of the connections at the moment of transfer of drive from the rewind line to the pressure lines. From these figures it will be seen that regardless of which one of the three connections is passing around a sprocket the first half of such travel requires the spring to contract while the second half requires the spring to expand, since the first 90 degrees of travel of the swivels 32s and 34s around a sprocket with their progressively slower longitudinal driving movement requires the spring to contract in order to take up the slack arising from the relatively faster movement of the connection 82s, while during the second 90 degree travel of the swivel connections 32s, 34s the relatively faster driving movement of the connection 82s compared to the longitudinal rewind movement of the swivel connections 32s, 34s requires the spring to expand. When on the other hand the connection 82s is passing around the first 90 degrees of sprocket travel, its relatively slower longitudinal driving movement requires spring contraction to furnish part of the driving movement, while during the second 90 degrees of travel of the connections 82s around a sprocket the connections 32s and 34s are driving and the relatively slower longitudinal movement of the connection 82s requires the spring to expand.

Just as the travel of any of the three connections around the sprockets may be divided into ranges of spring contraction and spring expansion, a corresponding range of contraction and expansion takes place during the approach and departure of any of the three connections toward and away from the winding reel D, such range being equal in length to the respective 90 degree arcs of conveyor chain travel around the sprocket, as shown in Figs. 17 to 19.

It will be apparent from the above considerations that the spring is at a minimum length from the standpoint of compensation for sprocket travel when the three connections are in the position shown in Fig. 19 and at a maximum length during that portion of the cycle when none of the three connections is passing around a sprocket; also that the difference between maximum and minimum spring lengths is approximately equal to one quarter of the circumference of an end sprocket minus the radius of such sprocket.

Inasmuch as the effects of the connections rounding the sprocket and the effects of changing diameters on the reel are superimposed and tend to some extent to offset each other, as a practical matter a spring 81 may be chosen merely to maintain adequate winding tension on the reel D at the position shown in Fig. 19 and of sufficient length to expand freely through a distance equal to the difference between the sprocket radius and one quarter of its circumference. If the spring satisfies these two conditions the requirements for variation in length of the rewind line will be adequately satisfied.

It will be noted that while the reel D reverses its direction of rotation every quarter cycle of the conveyor A, the reel will make a net advance of one complete revolution for each complete cycle of the conveyor A. This necessitates swivel connections 72 and 76 for the high and low pressure inlets which will permit continuous rotation.

While the swivel connections 33 and 35 between the feed lines 32 and 34 and the high and low pressure manifolds are not required to make complete revolutions, the same type as swivel connections 72 and 76 are used in order to avoid strain on the hose lines in making 180 degree reversals such as would be involved if rigid connections were used at these points.

Figure 7:
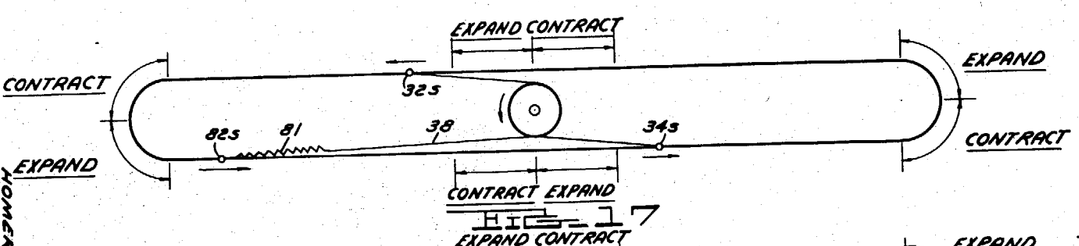
Fig. 7 is a transverse section taken along the line 7—7 of Fig. 2 showing the drive for the wheel conveyor and the inflating apparatus.

Referring to Fig. 7 it will be seen that the conveyor chain 27 for the inflating apparatus travels on upper and lower angle tracks 90a and 90b supported by structural members from main vertical supports 91, 92 and cross beam 93, the drive sprocket 36 for the conveyor chain 27 as well as the input power sprockets 94 and 40 being also supported in journals mounted on such members. This view also shows that bracket members 63 for carrying the valve assemblies C and the pipe fittings for the manifold lines 28 and 29 extend laterally from one side of the conveyor chain 27 and that the pressure outlet line 24 from the valve C is suspended directly over the center of the conveyor B and the wheels carried thereon. The fixed roller 59 for actuating the valve arm 30 at the loading end of the conveyor is held in the path of all valve arms 30 passing thereunder by angle 96 and other suitable connections from the main support members 91 and 93.

Fig. 8 illustrates the lateral relationship of the reel D with the manifold conveyor chain 27 and valve assemblies C, and also shows the transverse location of the fixed roller 31 for actuating the valve arm 30 of each passing valve assembly C to a low pressure position, such roller being carried by fixed channel member 98 connected to the base of the wheel conveyor B.

Figure 9:
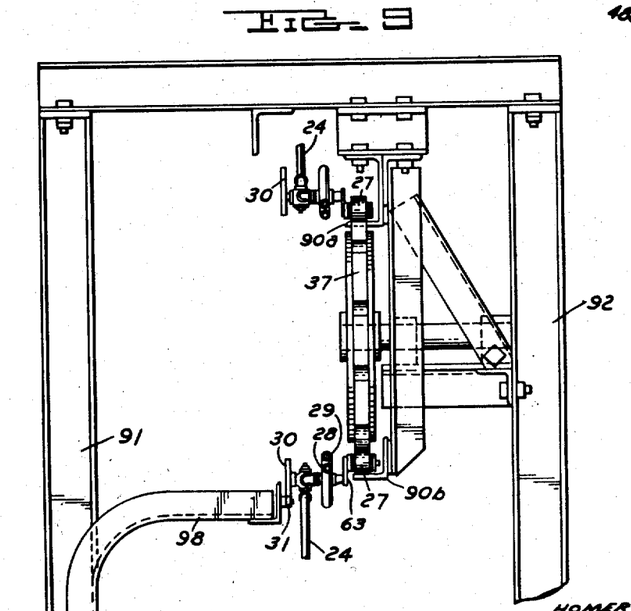
Fig. 9 is a transverse section taken along the line 9—9 of Fig. 2 showing the tail sprocket end of the inflating apparatus conveyor.

Fig. 9 illustrates the support for the tail sprocket 37 which is similar in all important respects to that of the head sprocket of Fig. 7.

From the above description it will be seen that the present embodiment provides a tire inflating machine wherein a wheel conveyor and manifold inflating apparatus conveyor are co-ordinated in a manner which permits a single workman to attend the machine by merely positioning each air chuck from successive outlet lines in inflating position on a tire valve passing thereunder; that the remaining automatic features of changing from high to final pressure at an intermediate point along the conveyor and of automatically uncoupling the air chuck at the end of the conveyor permit a tire to be accurately inflated and discharged in a continuous straight line assembly manner at practically any desired capacity rate depending on the speed of the conveyor, high pressure supply value, and length of conveyor, such production rate being limited only by the time required to place an air chuck onto the valve stem of a passing tire.

While a particular embodiment of my invention has been described above in detail it will be understood that numerous modifications could be made without departing from the scope of the invention as set forth in the following claims.

I claim:

1. In a tire inflating machine for use in inflating tires having valve stems provided with one way check valves, an air chuck adapted to be positioned over such valve stem and to open said check valve when pressed into engagement with a predetermined pressure, means for clamping said air chuck on to said valve stem characterized by a clamping member, a last motion connection between said clamping member and said air chuck, resilient means reacting between said clamping member and said air chuck to normally take up said last motion, means associated with said clamping member for gripping said valve stem after pressing said air chuck over said valve stem with a pressure sufficient to open said check valve and with a pressure sufficient to displace said air chuck relative to said clamping member against the force of said resilient means, said resilient means having a line of action for maintaining said air chuck in an operative inflating position when in an intermediate displaced position relative to said clamping member.

2. In a tire inflating machine for tires provided with valve stems having one way check valves therein and external threads on the surface thereof, an air chuck adapted when positioned over said valve stem with a sufficient pressure to open said check valve and establish communication between said air chuck and said tire as required to inflate the same, a manually operable clamping member pivotally connected to said air chuck, an aperture in said clamping member adapted to pass said valve stem into operative engagement with said air chuck, means for limiting the pivotal movement of said clamping member relative to said air chuck, said aperture being aligned with said air chuck when said clamping member is at one limit of its pivotal movement, and a plurality of teeth associated with said clamping member adjacent said aperture adapted to engage the external thread of said valve stem when said clamping member is pivotally moved to the other limit of its travel relative to said air chuck and to hold the air chuck in inflating engagement throughout the inflating cycle of said machine's operation.

3. A tire inflating machine characterized by a source of relatively low pressure corresponding to final desired tire pressure, a source of relatively high pressure for a relatively fast preliminary inflation of said tire, means for coupling a tire with said source of relatively high pressure, and means for establishing communication between said relatively low pressure source at an intermediate period in the tire inflating cycle of the machine's operation.

4. A two stage tire inflating machine comprising relatively high pressure inflating apparatus, relatively low final pressure inflating apparatus, means for connecting said tire with said high pressure inflating apparatus during the first stage of said machine's operation for rapid preliminary filling, and means for connecting said tire with said final pressure apparatus during the second stage of said machine's operation.

5. A two stage tire inflating machine comprising relatively high pressure inflating apparatus for rapid initial filling, relatively low final pressure inflating apparatus, common means for connecting said high and final pressure apparatus to a tire to be inflated, and valve means for diverting said common means to communicate with said high or low pressure source.

6. A two stage tire inflating machine comprising high pressure inflating apparatus, low pressure inflating apparatus, common means for connecting each pressure apparatus to a tire to be inflated including a diverting valve, means for actuating said valve to a high pressure position for rapid filling during a predetermined period of time, and automatic means for changing said valve from a high pressure to a low pressure position after said predetermined period of time.

7. A two stage tire inflating machine comprising a conveyor for transporting wheels with tires to be inflated, high pressure tire inflating apparatus, low pressure inflating apparatus, common means for connecting each apparatus to a tire traveling on such a conveyor including a diverting valve, means for actuating said valve to a high pressure position during the first portion of a wheel's travel along the conveyor, and automatic means for actuating said valve to a low pressure position for a second period of said wheel's travel along said conveyor.

8. A tire inflating machine comprising a conveyor for transporting wheels with tires to be inflated along a longitudinal path, an endless flexible air pressure manifold, means adapted to carry said manifold adjacent to said path, and a plurality of pressure outlets adapted to connect said manifold with the tires to be inflated on said conveyor, and means for maintaining tire inflating communication therebetween while wheels are traveling along said conveyor.

9. A tire inflating machine comprising a conveyor for transporting wheels with tires to be inflated, a pair of continuous manifolds for conducting air pressure, means for carrying said manifolds adjacent to said conveyor, a plurality of outlets adapted to connect a plurality of tires on said conveyor to said manifolds while traveling on said conveyor, including diverting means for each individual outlet adapted to alternate the communication of said outlet with one or the other of said manifolds.

10. A tire inflating machine comprising a conveyor for transporting wheels with tires to be inflated, a flexible manifold adapted to carry air pressure for inflating tires on said conveyor, means for carrying said manifold adjacent to said conveyor and endless conveyor means adapted to support said flexible manifold at intervals along its length.

11. A tire inflating machine comprising a conveyor for transporting wheels with tires to be inflated, a plurality of flexible manifolds adapted to carry air pressure of different values, an endless conveyor having one surface adapted to travel along said wheel conveyor and having its length substantially equal to the length of said flexible manifolds, supporting means at intervals along said endless conveyor for carrying said flexible manifolds along the path of said endless conveyor, a plurality of outlets for connecting said manifolds to the individual tires traveling adjacent thereto, and diverting valve means for alternating between manifold pressures connected to said outlets.

12. A tire inflating machine comprising a conveyor for transporting wheels with tires to be inflated, a pair of flexible manifold lines adapted to conduct air pressure of different values, means for carrying said manifolds along said conveyor, a pressure outlet adapted to establish communication between said manifolds and a tire traveling along said conveyor, a diverting valve for determining which of the manifold pressures is connected to said outlet, and stationary means along the path of said valve adapted to actuate said valve from one pressure position to another in response to the movement past such stationary means.

13. A tire inflating machine comprising a conveyor for transporting wheels with tires to be inflated, a pair of flexible pressure manifold lines adapted to conduct pressures of different values for inflating said tires, means for carrying said manifold lines along said conveyor, a plurality of common outlets each adapted to conduct pressure from either manifold line to an individual tire traveling along said conveyor, including individual valve means for diverting air pressure from one manifold or the other to each outlet, fixed means located at intervals along said conveyor and co-operating means associated with each of said valves for actuating the valve as it passes said fixed means in a manner adapted to provide a relatively high pressure at each outlet during the first portion of the inflating travel and for effecting a relatively low pressure at said outlet during a second portion of its inflating travel.

14. A tire inflating machine comprising a conveyor for transporting wheels with tires to be inflated, a pair of flexible pressure manifold lines adapted to conduct pressures of different values for inflating said tires, means for carrying said manifold lines along said conveyor, a plurality of common outlets for conducting pressure from said manifold lines to the individual tires traveling along said conveyor, individual valve means for diverting air pressure from one manifold or the other to each outlet, fixed means located at intervals along said conveyor, and co-operating means associated with each of said valves for actuating each valve as it passes said fixed means in a manner to provide a relatively high pressure at each outlet during the first portion of the inflating travel and for effecting a relatively low pressure at said outlet during a second portion of its travel, said valve actuating means comprising a fixed stop member in the path of said valve and a valve actuating arm operatively connected to each valve adapted to engage said stop upon passing the same thereby moving the valve to a new position.

15. A tire inflating machine comprising a conveyor for transporting wheels with tires to be inflated, a flexible endless manifold pressure line adapted to move along a path adjacent to said wheel conveyor and then follow a return path to its starting point, pressure conducting means for connecting said manifold to the tires on said conveyor, a pressure feed line connected to said manifold line, and a rotatable reel adapted to unwind and rewind said pressure feed line in order to permit it to follow the path of said manifold line.

16. A tire inflating machine comprising a conveyor for transporting wheels with tires to be inflated, an endless flexible pressure manifold line adapted to follow a path adjacent to the said conveyor and then follow a return path to the starting point, an endless conveyor mechanism for supporting said manifold line and moving the same as required, pressure conducting means for connecting said manifold to the tires on said conveyor, a pressure lead line connected to said manifold line, a rotatable reel for winding and unwinding the said pressure lead line as required in order to permit it to follow the path of said manifold line, tension in the lead line being employed to unwind said reel by force transmitted from said manifold conveyor, and means for rewinding said reel as required.

17. A tire inflating machine comprising a conveyor for transporting wheels with tires to be inflated, an endless flexible pressure manifold line adapted to follow a path adjacent to the said conveyor and then follow a return path to the starting point, an endless conveyor mechanism for supporting said manifold line and moving the same as required, pressure conducting means for connecting said manifold to the tires on said conveyor, a pressure lead line connected to said manifold line, a rotatable reel for winding and unwinding the said pressure lead line as required in order to permit it to follow the path of said manifold line, tension in the lead line being employed to unwind said reel by force transmitted from said manifold conveyor, and means for rewinding said reel as required comprising a second line wound on said reel in a direction opposite to that of said pressure lead line, said second line being connected to said manifold conveyor at a point spaced from the connection of said pressure lead line such as to cause said second line to unwind while the pressure lead line is winding on said reel and to wind while said pressure line is unwinding.

18. A tire inflating machine comprising a conveyor for transporting wheels with tires to be inflated, an endless flexible pressure manifold line adapted to move along a path adjacent to said conveyor and then follow a return path to the starting point, pressure conducting means for connecting said manifold to the tires on said conveyor, a pressure feed line connected to said manifold line, a reel adapted to wind and unwind said pressure feed line as required in order to permit it to follow the path of said manifold line, a stationary journal for said reel, an annular pressure feed member rigidly associated with said reel communicating with said feed line and having an axis coinciding that of said reel, a stationary pressure supply line and a swivel connection between said supply line and said annular member permitting pressure to be fed to said feed line while said reel is rotating.

19. A tire inflating machine comprising a conveyor for transporting wheels with tires to be inflated, a pair of endless flexible pressure manifold lines adapted to travel along a path adjacent to said conveyor and then to follow a return path to the starting point, pressure conducting means for connecting alternately either of said manifold lines to the tires on said conveyor, a pair of pressure feed lines each connected to one of said manifolds, a reel adapted to wind and unwind said feed lines in order to permit them to follow the path of said manifold lines, a stationary journal for said reel, an annular pressure feed member rigidly associated with the said reel communicating with one of said pressure feed lines and having an axis coinciding with the axis of rotation of said reel, a second annular feed member rigidly associated with the said reel communicating with the other of said pressure feed lines and also having an axis coinciding with the axis of rotation of said reel, a pair of stationary pressure supply lines adapted to carry different pressures, and separate swivel connections between each of said stationary lines and one of said annular pressure feed members whereby separate air pressures may be conducted to each of said pressure feed lines while said reel is rotating.

20. A tire inflating machine comprising a conveyor for transporting wheels with tires to be inflated, an endless flexible pressure manifold adapted to travel in a path adjacent to said conveyor and to then follow a return path to a starting point, pressure conducting means for connecting said manifold to the tires on said conveyor, a pressure lead line connected to said manifold, a reel for winding and unwinding said pressure feed line as required to follow the path of said manifold line, an endless conveyor for carrying said manifold line and for supplying the power to unwind said reel through tension imparted to said pressure lead line, a second line wound on said reel in a direction opposite to that of said pressure lead line, said second line being connected to said endless conveyor at a point spaced from the connection of said pressure lead line in a manner such as to cause said second line to wind on the reel while said pressure lead line is unwinding and vice versa, tension in said second line providing the force for rotating said reel to rewind said pressure feed line, and resilient means in said second line adapted to compensate for instantaneous variations in the relative rates of winding and unwinding of the respective pressure lead line and second line.

21. A tire inflating machine comprising a conveyor for transporting wheels with tires to be inflated, a pair of endless flexible pressure manifold lines adapted to travel along the path adjacent to said conveyor and then follow a return path to a starting point, an endless conveyor mechanism for carrying said flexible manifold lines, pressure conducting means for connecting alternately either of said manifold lines to the tires on said conveyor, a separate pressure feed line connected to each of said manifold lines, a rotatable reel adapted to wind and unwind said pressure lead lines as required to permit them to follow the path of said manifold lines, said pressure lead lines being wound on said reel in the same direction and connected to the respective manifold lines at points such as to require simultaneous winding and unwinding at equal rates, a third line wound on said reel in a direction opposite to that of said pressure lead lines, said third line being connected to said endless conveyor at a point spaced from the connections of said pressure lead lines in a manner such that it will be wound onto said reel while said pressure lead lines are unwinding and vice versa whereby tension in said third line may be employed to rotate the reel in a direction for rewinding said pressure feed lines.

22. A tire inflating machine comprising a conveyor for transporting wheels with tires to be inflated, a pair of endless flexible pressure manifold lines adapted to travel along the path adjacent to said conveyor and then follow a return path to a starting point, an endless conveyor mechanism for carrying said flexible manifold lines, pressure conducting means for connecting alternately either of said manifold lines to the tires on said conveyor, a separate pressure feed line connected to each of said manifold lines, a rotatable reel adapted to wind and unwind said pressure lead lines as required to permit them to follow the path of said manifold lines, said pressure lead lines being wound on said reel in the same direction and connected to the respective manifold lines at points such as to require simultaneous winding and unwinding at equal rates, a third line wound on said reel in a direction opposite to that of said pressure lead lines, said third line being connected to said endless conveyor at a point spaced from the connections of said pressure lead lines in a manner such that it will be wound onto said reel while pressure lead lines are unwinding and vice versa whereby tension in said third line may be employed to rotate the reel in a direction for rewinding said pressure feed lines, said reel being provided with separate tracks for accommodating the respective separate coils simultaneously wound on said reel.

23. A tire inflating machine characterized by a longitudinally extending conveyor for transporting wheels with tires to be inflated, a separate endless conveyor for transporting inflation apparatus adjacent to said wheel conveyor, said inflating apparatus comprising an endless pressure manifold carried by said second conveyor, and a plurality of flexible pressure outlet lines communicating with said manifold and longitudinally spaced at intervals to permit their individual connection with individual wheels traveling on said wheel conveyor in a manner adapted to effect the simultaneous inflation of a plurality of wheels traveling on said wheel conveyor.

24. A tire inflating machine characterized by a longitudinally extending conveyor for transporting wheels with tires to be inflated, a separate endless conveyor for transporting inflation apparatus adjacent to said wheel conveyor, said inflating apparatus comprising an endless pressure manifold carried by said second conveyor, a plurality of flexible pressure outlet lines communicating with said manifold and longitudinally spaced at intervals to permit their individual connection with individual wheels traveling on said wheel conveyor in a manner adapted to effect the simultaneous inflation of a plurality of wheels traveling on said wheel conveyor, and means for changing the effective pressure in said outlet lines at a predetermined point along the path of said conveyor.

25. A moving fluid pressure supply system comprising an endless flexible fluid hose, means for moving said hose in an endless loop, manifold connections in said endless hose for communicating with the fluid pressure supply conducted therein at a plurality of moving stations, a supply connection in said endless hose, a fixed source of fluid pressure varying from atmospheric, and a supply hose adapted to extend between said supply connection and said fixed source throughout the movement of said supply connection around said endless loop.

26. A fluid pressure supply system as set forth in claim 25 wherein said means for moving said endless hose in an endless loop includes a conveyor chain passing around end sprockets conforming to the path of said loop, and wherein supporting connections are provided between said conveyor chain and hose at a plurality of points.

27. A fluid pressure supply system as set forth in claim 25 wherein said means for moving said endless hose in an endless loop includes a conveyor chain passing around end sprockets conforming to the path of said loop, and wherein supporting connections between said conveyor chains and hose are provided at each of said manifold connections.

28. A fluid pressure supply system as set forth in claim 25 wherein reel means are provided for feeding out and retracting said supply hose as required to follow said supply connection throughout said endless loop.

29. A moving multiple fluid pressure supply system comprising a plurality of endless flexible hoses, conveyor means for moving said hoses in adjacent endless loops, manifold connections in each of said endless hoses for communicating with the respective fluid pressures supplied therein at a plurality of moving stations, common fluid lines each adapted to communicate with one of said manifold connections in each of said respective endless hoses, valve means for selectively establishing communication between each common line and any of the respective endless hoses, a fluid pressure supply connection for each of said endless hoses, a fixed source of fluid pressure for each of said hoses, and a supply hose for each of said endless hoses adapted to extend between said supply connection and the respective fixed source throughout the movement of said supply connection around said endless loop.

References Cited in the file of this patent

UNITED STATES PATENTS

| | | |
|---|---|---|
| 1,738,491 | Brown | Dec. 3, 1929 |
| 2,325,816 | Waters | Aug. 3, 1943 |
| 2,369,563 | Gustin et al. | Feb. 13, 1945 |
| 2,411,235 | Smith | Nov. 19, 1946 |
| 2,530,755 | Bingham | Nov. 21, 1950 |
| 2,539,055 | Brooke | Jan. 23, 1951 |